United States Patent
Tee (10) Patent No.: US 7,054,631 B2
(45) Date of Patent: May 30, 2006

(54) ENHANCEMENT OF SOFT HANDOFF IN A MOBILE WIRELESS NETWORK THROUGH THE USE OF DYNAMIC INFORMATION FEEDBACK FROM MOBILE USERS

(75) Inventor: Lai King Tee, San Diego, CA (US)

(73) Assignee: DENSO Corporation, Kariya (JP)

( * ) Notice: Subject to any disclaimer, the term of this patent is extended or adjusted under 35 U.S.C. 154(b) by 675 days.

(21) Appl. No.: 10/000,144

(22) Filed: Oct. 23, 2001

(65) Prior Publication Data

US 2002/0049058 A1    Apr. 25, 2002

Related U.S. Application Data

(60) Provisional application No. 60/242,538, filed on Oct. 23, 2000.

(51) Int. Cl.
*H04Q 7/20* (2006.01)

(52) U.S. Cl. .................. 455/436; 455/437; 455/442

(58) Field of Classification Search .............. 455/436, 455/437, 440, 441, 442
See application file for complete search history.

(56) References Cited

U.S. PATENT DOCUMENTS

| | | | |
|---|---|---|---|
| 5,101,501 A | 3/1992 | Gilhousen et al. | |
| 5,926,470 A * | 7/1999 | Tiedemann, Jr. | ............ 370/334 |
| 5,956,641 A | 9/1999 | Bruckert et al. | |
| 6,108,547 A | 8/2000 | Yamashita et al. | |
| 6,108,548 A | 8/2000 | Furukawa et al. | |
| 6,119,018 A | 9/2000 | Kondo | |
| 6,122,511 A | 9/2000 | Ozluturk | |
| 6,141,565 A * | 10/2000 | Feuerstein et al. | .......... 455/560 |
| 6,151,502 A | 11/2000 | Padovani et al. | |
| 6,266,529 B1 | 7/2001 | Chheda | |
| 6,295,452 B1 | 9/2001 | Choi | |
| 6,438,116 B1 * | 8/2002 | Corbett | ....................... 370/331 |
| 6,738,618 B1 * | 5/2004 | Morales et al. | ............. 455/419 |
| 2001/0051524 A1 * | 12/2001 | Hunzinger | .................. 455/442 |

* cited by examiner

*Primary Examiner*—Charles N. Appiah
*Assistant Examiner*—Bryan Fox
(74) *Attorney, Agent, or Firm*—Harness, Dickey & Pierce, PLC (57) ABSTRACT

A method and system of determining a handoff timing parameter based on the call category such as location and mobility class of a group of mobile wireless device is disclosed. The method includes the feedback of certain information by some mobile wireless device to the base station. This feedback information provides an indication on the condition of the forward link channel connecting the mobile wireless device to the base station (sector). The base station can thus make more intelligent decisions on the handoff parameters. Further, as the channel conditions vary significantly for mobile wireless devices at different locations of a cell, traveling with different speeds, different values for the handoff timing parameters are desirable to better optimize the network as a whole. Mobile wireless devices that may not have the capability to adapt can also be benefited from this system.

13 Claims, 9 Drawing Sheets

| SHO REGION | MOBILITY | | |
|---|---|---|---|
| | LOW | MEDIUM | HIGH |
| 1 | | | |
| 2 | | | |
| 3 | | | |
| 4 | | | |
| 5 | | | |
| 6 | | | |

T_TDROP
- NOMINAL
- RANGE

| T_TDROP INDEX | T_TDROP TIMER EXPIRATION (SECS) | T_TDROP INDEX | T_TDROP TIMER EXPIRATION (SECS) |
|---|---|---|---|
| 0 | 0.1 | 8 | 27 |
| 1 | 1 | 9 | 39 |
| 2 | 2 | 10 | 55 |
| 3 | 4 | 11 | 79 |
| 4 | 6 | 12 | 112 |
| 5 | 8 | 13 | 159 |
| 6 | 9 | 14 | 225 |
| 7 | 13 | 15 | 319 |

ENHANCEMENT OF SOFT HANDOFF IN A MOBILE WIRELESS NETWORK THROUGH THE USE OF DYNAMIC INFORMATION FEEDBACK FROM MOBILE USERS

CROSS-REFERENCE TO RELATED APPLICATIONS

This application claims the benefit of U.S. Provisional Application No. 60/242,538, filed Oct. 23, 2000, the entire disclosure of which is incorporated herein by reference.

TECHNICAL FIELD

This invention relates to wireless communications devices, and more particularly to handoff methods for wireless communications based on CDMA.

BACKGROUND

Cellular telephones may operate under a variety of standards including the code division multiple access (CDMA) cellular telephone communication. CDMA is a technique for spread-spectrum multiple-access digital communications that creates channels through the use of unique code sequences. It allows a number of mobile terminals to communicate with one or more base stations in the neighboring cell sites, simultaneously using the same frequency. In CDMA systems, signals can be received in the presence of high levels of narrow-band or wide-band interference. The practical limit of signal reception depends on the channel conditions and interference level. Types of interference include those generated when the signal is propagated through a multi-path channel, signals transmitted to and from other users in the same or other cell sites, as well as self-interference or noise generated at the device or mobile terminal. Typically, a receiver of the CDMA signal includes a number of demodulators or fingers, each of which can be used to demodulate signals received from a different propagation path. The demodulated signals from each finger may then be combined through maximum ratio combining or other similar combining algorithms. A Rake receiver is one of these types of demodulators. A separate finger can be used to search and identify signals arriving through various paths, usually with the help of a pilot signal.

A mobile station using the CDMA standard may constantly search a Pilot Channel of neighboring base stations and adjacent sectors of the serving base station, for a pilot that is sufficiently stronger than a pilot add threshold value, T_ADD which can be a static value or dynamic value as described in the standards. When such a pilot is found, the mobile station sends a Pilot Strength measurement message (PSMM) to the base station. As the mobile station moves from the region covered by one base station (sector) to another, the mobile station promotes certain pilots from the Neighbor Set to the Candidate Set, and notifies the base station or base stations of the promotion from the Neighbor Set to the Candidate Set via PSMM. The base station determines an Active Set according to the PSMM, and notifies the mobile station of the new Active Set via a Handoff Direction Message. The mobile station may maintain communication with all the base stations and base station sectors that are included in the active set. When the active set contains more than one base station, the mobile terminal is said to be in soft handoff with those base stations. When the active set contains more than one sector originating from the same base station, the mobile terminal is in softer handoff with those sectors. When the pilot of one of the base station (sectors) in the active set weakens to less than a pilot drop threshold value T_DROP for a time exceeding T_TDROP, the mobile station notifies the base station of the change through a PSMM. The base station may then determine and notify the mobile station of a new active set that will normally not include the base station or sector whose pilot was reported to have degraded below T_DROP for a duration of T_TDROP. Upon notification by the base station, the mobile station then demotes the weakened pilot to the Neighbor Set. This mechanism enables soft and softer handoff. The present invention involves an enhancement to the procedure for both cases of soft and softer handoff. The present invention can also be applied to other similar soft handoff process, such as that specified in 3GPP TR 25.922 (WCDMA standard), where the parameter "Time to Trigger" is similar to T_TDROP.

SUMMARY

A method of determining handoff timing for a wireless device is provided. In a first embodiment of soft handoff, a base station informs all mobile stations in the same sector a single, fixed value for T_TDROP, i.e., the time duration for which a pilot signal level stays below the drop threshold, before it may subsequently be removed from the active set. In a second embodiment of soft handoff, the mobile station uses a dynamic T_TDROP timer to allow it to select the optimum T_TDROP value within a range (T_TDROP_RANGE) centered about a nominal T_TDROP value, based on the channel dynamics experienced. In the second embodiment, both the nominal and range for T_TDROP are sent to the MS by the BS. The present invention allows mobile stations equipped with the second embodiment of soft handoff to communicate their optimum values of T_TDROP to the base station. The base station can then use this feedback to modify the fixed value (or nominal value or range) used by mobile stations using either embodiment to perform more efficient soft handoffs. The characteristics of a mobile wireless channel vary significantly. The fading characteristics of the channel depend on the transmitted carrier frequency, traveling speeds of mobile terminal users, and their locations where the environment may cause random and significant signal variations through shadowing and multi-paths. With the feedback of the adapted pilot drop timer value T_TDROP, the base station can gain some knowledge on the channel variation as experienced by mobile terminals that are performing soft or softer handoff at various locations while traveling at various speeds. The base station can then make use of this knowledge to determine a nominal value and range for T_TDROP that are closer to the optimum values, to be used by mobile terminals that may or may not be able to adapt to an optimum T_TDROP.

DESCRIPTION OF DRAWINGS

Like reference symbols in the various drawings indicate like elements.

DETAILED DESCRIPTION

Figure 1:
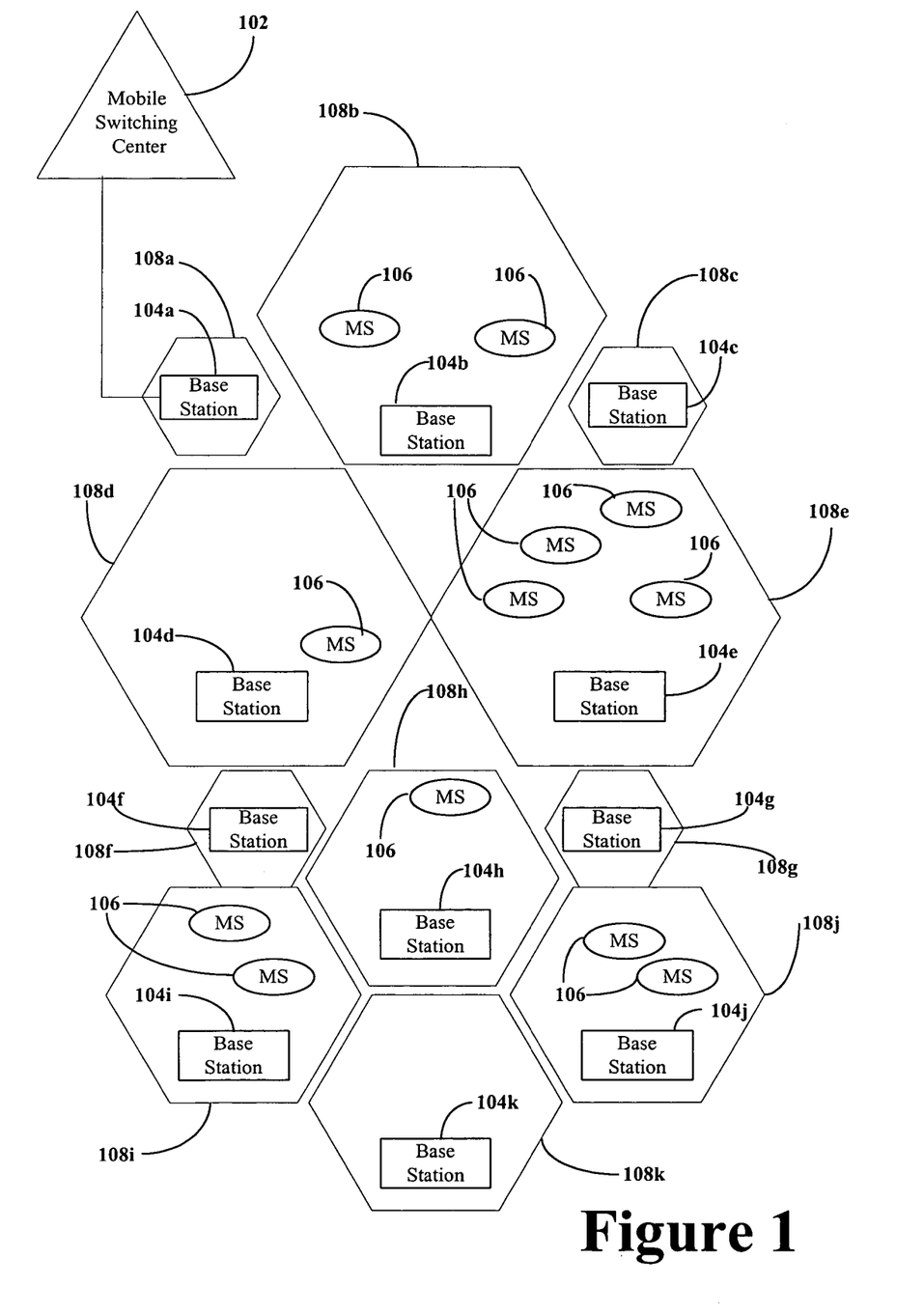
FIG. 1 is an illustration of a wireless communication system.

FIG. 1 illustrates components of an exemplary wireless communication system. A mobile switching center 102 communicates with base stations 104a–104k (only one connection shown). The base stations 104a–104k (generally 104) transmit data to and receive data from mobile stations 106 within cells 108a–108k (generally 108). A cell 108, corresponding to a geographic region, is served by a base station. Practically, said geographic regions often overlap to a limited extent.

A mobile station 106 is capable of receiving data from and transmitting data to a base station 104. In one embodiment, the mobile station 106 receives and transmits data according to a Code Division Multiple Access (CDMA) technique. CDMA is a communication technique that permits mobile users of wireless communication devices to exchange data over a telephone system, wherein radio signals carry data to and from the wireless devices. A set of standards that define a version of CDMA that is particularly suitable for use with the invention include IS95, IS-95A, and IS-95B, Mobile Station-Base Station Compatibility Standard for Dual-Mode Spread Spectrum Systems; TIA/EIA/IS-2000-2, Physical Layer Standard for cdma2000 Spread Spectrum Systems, TIA/EIA/IS-2000-5 Upper Layer (Layer 3) Signaling Standard for cdma2000 Spread Spectrum Systems; and 3GPP TR25.922, all of which are herein incorporated by reference in their entirety.

Under the CDMA standard, additional cells 108a, 108c, 108d, and 108e adjacent to the cell 108b permit mobile stations 106 to cross-cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104. In sectorized cell sites, a mobile station 106 may communicate with one or more sectors of the same base station 104 simultaneously while moving within a cell. In this case, the base station 104 co-ordinates all communication between the mobile station 106 and the concerning sectors.

Mobile stations 106 may move about freely within the cell 108 while communicating either voice or data. Mobile stations 106 not in active communication with other telephone system users may, nevertheless, continue to scan for transmissions from the base stations 104 in the cells 108 to detect pilots that are sufficiently strong with which to establish a communications link or to be included in the active set. In addition, mobile stations 106 may remove from the active set base stations (sectors) 104 in which the energy level of the pilot is not sufficiently strong. However, as described earlier, the inclusion and removal of base station (sectors) from the active set need authorization by the network infrastructure.

Figure 2:
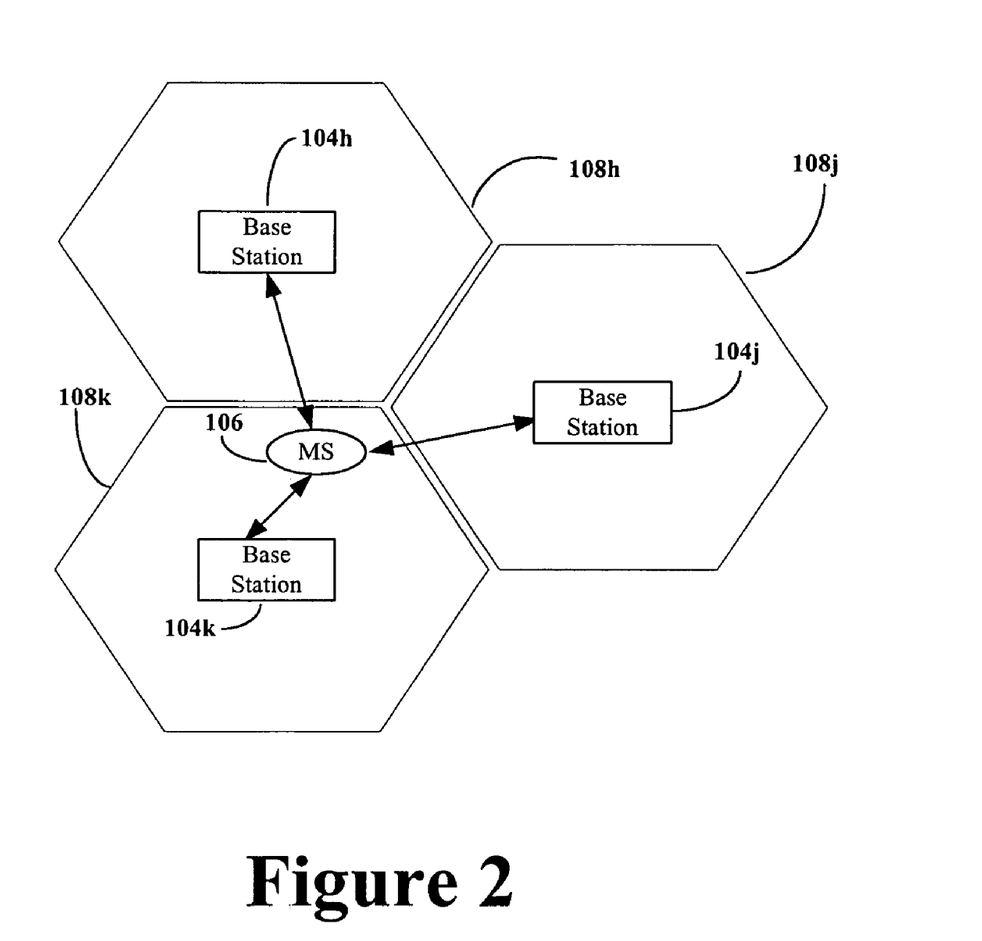
FIG. 2 is an illustration of a portion of a wireless communication system.

One example of such a mobile station 106 is a cellular telephone used by a vehicle driver who talks on the cellular telephone while driving in a cell 108k. Referring to FIG. 2, a portion of a wireless system is shown. The cellular telephone synchronizes communication with the base station 104k by monitoring a pilot that is generated by the base station 104k. While powered on, the mobile station 106 continues to scan predetermined CDMA system frequencies for pilots from other base stations 104 such as the pilots from the base stations 104h and 104j as well as the pilot corresponding to the base station 104k. Upon detecting a pilot from another base station 104h, the mobile station 106 initiates a handoff sequence to add the pilot to the Active Set as described previously. Likewise, upon determining that the energy level (or the ratio of average energy per PN chip of the pilot signal to the total received power spectral density) of an Active Set pilot has weakened sufficiently, and the pilot drop timer, T_TDROP, has expired, the mobile station 106 initiates a handoff sequence to remove the corresponding base station (sector) from the active set, as described previously.

Wireless communications standards may require a mobile station to use a static T_TDROP value that is generally provided by the network. The pilot add and drop thresholds, T_ADD and T_DROP respectively may similarly be provided by the network as additional Pilot Set Maintenance parameters. The pilot add and pilot drop thresholds may also be computed dynamically by mobile stations, base stations, and the network. Other additional parameters may be provided by the network if dynamic add and drop thresholds are enabled. The static value of T_TDROP is used for all pilots. Using a static T_TDROP value is not optimal for a mobile wireless network. This is because the mobile wireless channel characteristics vary significantly with time, speed, propagation path, as well as the number of active mobile terminal users. Thus, a static T_TDROP value may result in base stations being removed from the active set of some mobile terminals too early - or too late for some others, which may degrade the call quality as well as the capacity of the cell sites.

An alternative to the static T_TDROP timer is a dynamic pilot drop timer. In one embodiment of the dynamic pilot drop timer methodology, the mobile station may adapt the value of T_TDROP to an optimum value within a range specified by the wireless infrastructure based upon a current call characteristic. The infrastructure informs the mobile terminal of the nominal value and range to be used for T_TDROP. The mobile terminal may then perform an algorithm to adapt to an optimum T_TDROP value for a base station (sector) pilot in the active set, when the pilot strength has fallen below the drop threshold. The details of this mechanism are described below with reference to FIGS. 3–6.

Figure 3:
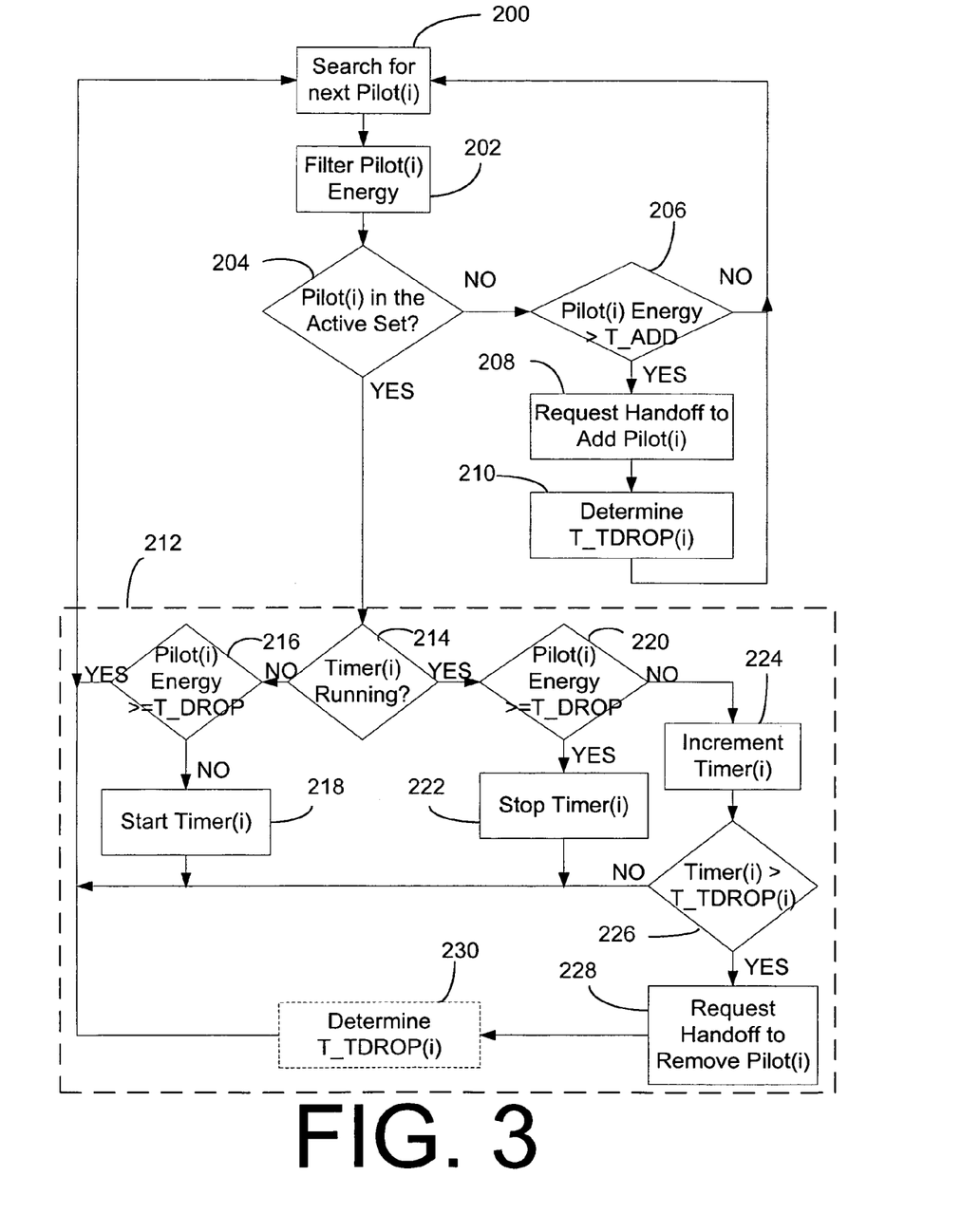
FIG. 3 is an illustration of a CDMA Handoff technique.
Figure 9:
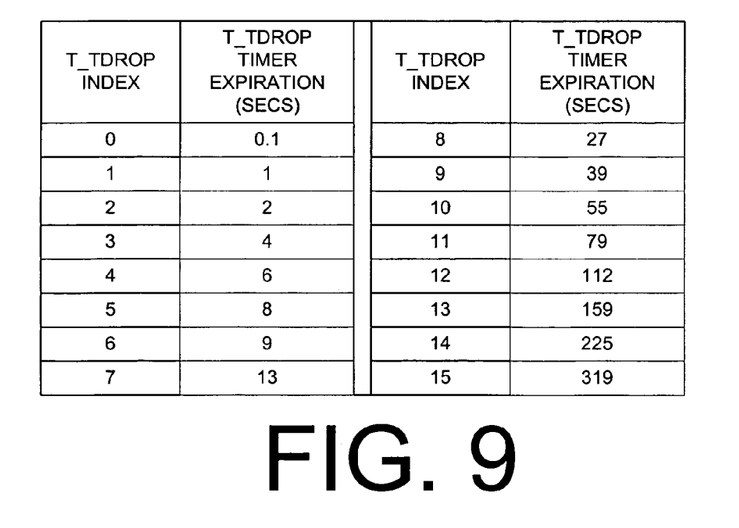
FIG. 9 shows a Table of possible values for the nominal value of a dynamic pilot drop timer for use in one embodiment of the invention.

FIG. 3 shows a flow diagram of a Pilot Set Maintenance and handoff process. Incorporated within the handoff process is a method of dynamically selecting a value for the handoff timeout, T_TDROP, on a per pilot basis. In one embodiment this value may be selected within a range of permissible values where the network generally transmits such parametric information through base stations 104 transmitting to mobile stations 106. These parameters can be included in overhead messages, parameter messages, traffic or idle messages, or handoff messages. The network may specify such a range by either specifying a nominal handoff timeout value and a range about that nominal value or by specifying maximum and minimum values. The range may be specified indirectly according to a formula or table lookup. In one embodiment, the range may be specified by the network as an index into the static T_TDROP table included in the IS-95-A standard (FIG. 9). In another embodiment, the range may be specified by a Handoff Timeout Deviation about a nominal value such that the adapted handoff timeout is limited to being between [Nominal Handoff Timeout×(1−$2^{8-Handoff\ Timeout\ Deviation}$) ] and [Nominal Handoff Timeout×(1+$2^{8-Handoff\ Timeout\ Deviation}$) ]. In this case, the network need only send the Nominal Handoff Timeout and the Handoff Timeout Deviation parameters.

The network can be calibrated or configured with parameter values as a result of network engineering or that are known to result in compliance with minimum performance standards.

Dynamically selecting the T_TDROP value advantageously improves the signal to noise ratio (SNR) of the system, increases capacity, reduces the signaling overhead, and reduces the chances of a call being inadvertently dropped. The described handoff process is merely exemplary and is non-limiting. The scope of the invention is not limited to the described handoff process. In addition, although the process is described as being executed within a mobile station, the scope of the invention includes performing the process either entirely or partially in other system components such as base stations and mobile switching centers.

At block 200, the mobile station 106 searches for pilots from base stations 104 and measures their energies. When a pilot's energy is measured, the process proceeds to block 202 and the pilot energy is filtered such as using an infinite impulse response filter, or a running average or mean. Proceeding to block 204 the Active Set is checked to determine if the pilot is active, i.e. included. If the pilot is not active, then at block 206 the energy level of the pilot is tested against the required energy level for adding a pilot, T_ADD. If the energy level of the pilot does not exceed T_ADD, control returns to the start of the process at block 200. If the energy level of the pilot does exceed T_ADD, the mobile station 106 moves the pilot into the Candidate Set and sends a Pilot Strength Measurement Message (PSMM) to the current base stations to request that the pilot be added to the Active Set, block 208. Proceeding to block 210, the mobile station 106 then determines an adapted value for the pilot drop handoff timeout, T_TDROP. At a later step in the handoff process, the value of T_TDROP is compared to the time duration that the pilot signal energy is below a predetermined level to determine whether a request to drop the pilot should be sent. The adapted value of T_TDROP is determined on a per pilot basis.

In one embodiment of the handoff process, the value of T_TDROP is adapted for each specific pilot at the time of a handoff request to add that pilot. The scope of the invention also includes adapting the value of T_TDROP periodically, as well as at other times within the handoff process such as a request to remove a pilot, block 230. In other embodiments, the adaptation could occur when a pilot energy crosses a threshold, parametric information is updated from the network, or at the time of measuring pilot energy. In addition, a single value of T_TDROP may be dynamically determined and applied to all pilots or particular sets of pilots. For example, these sets could be the Active Set, Neighbor Set, Candidate Set, and Remaining Set.

Returning to block 204, if the pilot that was detected is an active pilot, control continues on to block 212 to timer operations and determining whether to remove the pilot. Block 214 checks if the timer corresponding to the pilot is running or stopped. If the timer is not running, then the process continues to block 216. If Ec/Io is equal to or exceeds T_DROP, the pilot strength is considered sufficient to retain the pilot in the Active Set and control returns to the start of the process. Otherwise, if Ec/Io is less than T_DROP for the Active Set pilot, then instead of immediately removing the pilot from the Active Set, the timer begins a timeout sequence, block 218. If a later measurement of Ec/Io for the pilot exceeds T_DROP before the timer times out by reaching T_TDROP, the timer is reset, blocks 220 and 222.

On the other hand, if a later measurement of Ec/Io does not exceed T_DROP, then continuing to block 224, the timer is incremented. At block 226, the timer is compared to the adapted value of T_TDROP(i) corresponding to the pilot to determine whether the timer has timed out. If the timer has not timed out, control returns to the start of the process at block 200. If the timer has timed out, indicating that the pilot strength has been below T_DROP for an interval exceeding T_TDROP, the process proceeds to block 228 and the mobile station 106 sends a Pilot Strength Measurement Message (PSMM) to the current Base Stations 104 requesting a Handoff Direction Message (HDM) to remove the pilot from the Active Set.

Figure 4:
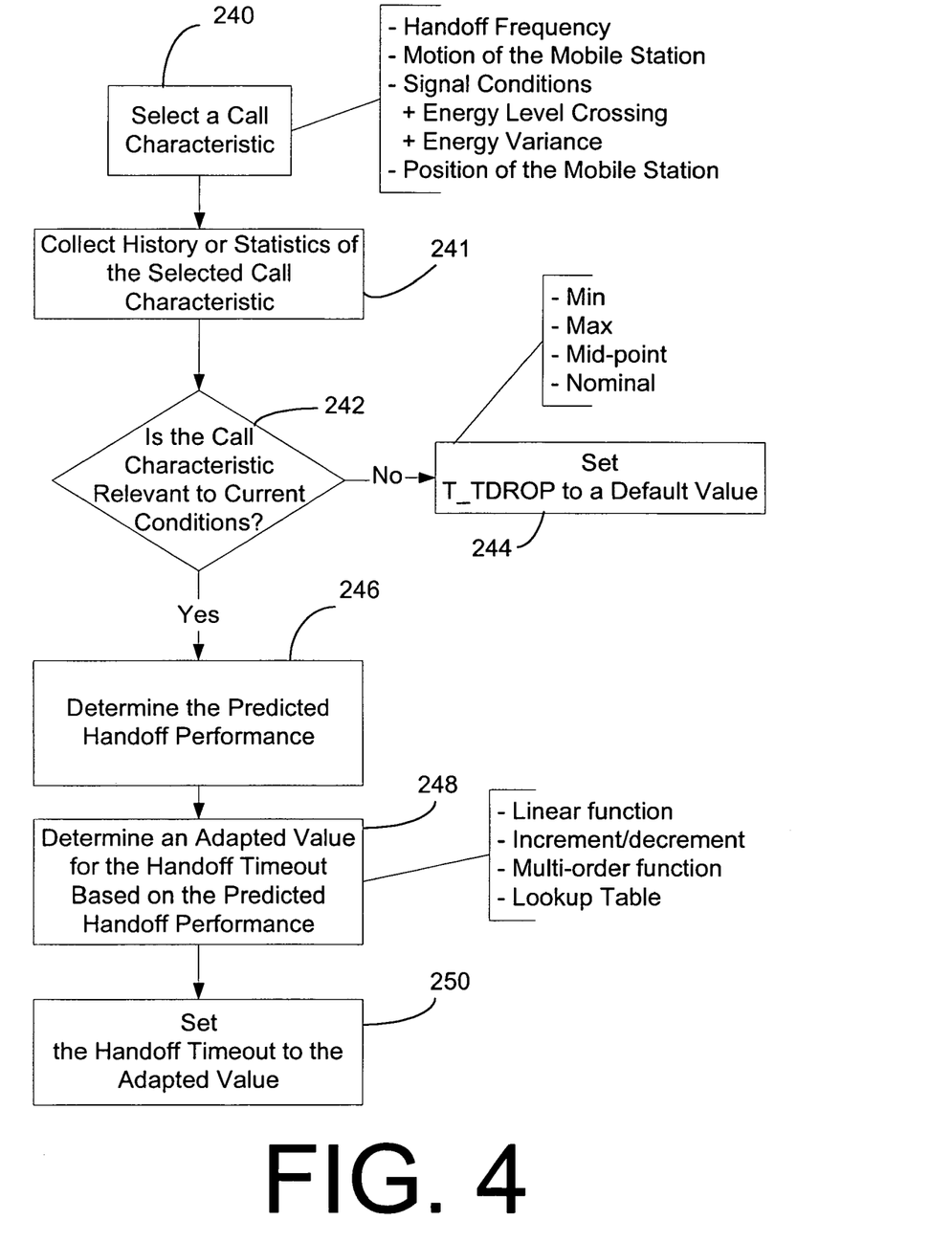
FIG. 4 is an illustration of a timeout adaptation.

Referring to FIG. 4, a block diagram of an adaptation process for dynamically determining the handoff timeout value, T_TDROP, is shown. Initially, at block 240 a call characteristic that can be statistically analyzed for predicted performance is selected. In one embodiment, the handoff frequency is selected. However, the scope of the invention includes other call characteristics such as motion of the mobile station, signal quality (as indicated by but not limited to combined Eb/Nt, Frame Error Rate, Symbol Error Rate, Bit Error Rate, number of retransmissions), energy level crossing, and energy variance. A history or statistics are collected for the selected call characteristic, block 241. History may include the recent timing of handoffs adding or deleting pilots, the recent signal quality changes over time, position and motion of the wireless mobile station, or the past adapted handoff timeout values that were in use. Data relevant to the call characteristic is evaluated to determine if that characteristic is relevant to the current conditions, block 242. The call characteristic data includes historical or statistical information of the call characteristic. For example, if handoff frequency is the selected call characteristic, then the history of additions and drops of the pilot is evaluated to determine if the time since the last drop is greater than a predetermined minimum time; if so, then handoff frequency is considered not currently relevant. If the call characteristic is considered not currently relevant, the process continues on to block 244 and the value of T_TDROP is set to a default timeout value. The default timeout value is preferably a minimum time, however the default timeout value may be other measures of time such as a maximum or a mid-point. If the call characteristic is relevant, the process proceeds to block 246 and the predicted handoff performance is determined. Then at block 248 of the process, a new adapted value for the handoff timeout is determined based upon the predicted handoff performance and the current handoff timeout value. A linear function is applied to the current handoff timeout value to determine the adapted handoff timeout value. The scope of the invention also includes employing other functions for determining the adapted handoff value such as applying a multi-order function, incrementing/decrementing by a fixed quantity, and selecting a value from a lookup table that is constructed based on past decisions. T_TDROP is then set to the adapted value at block 250 of the process.

Figure 5:
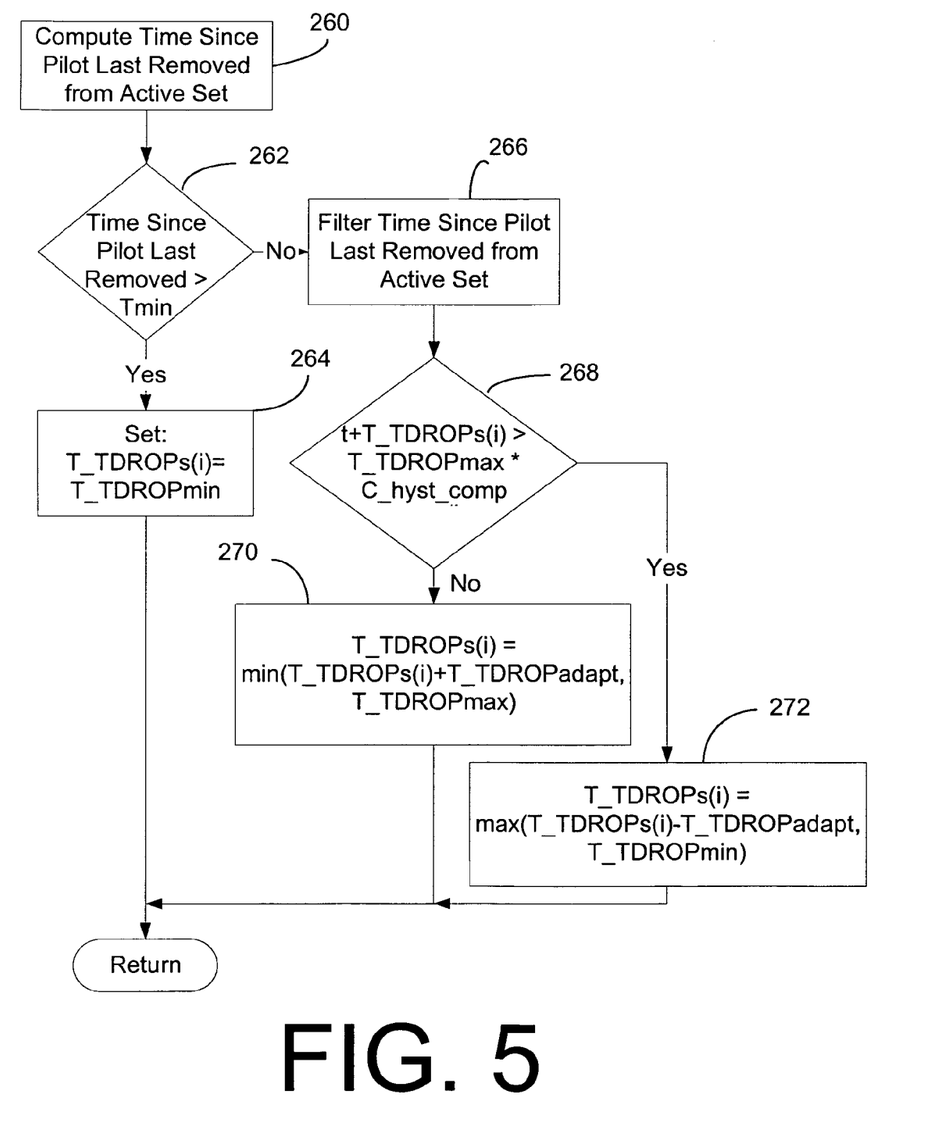
FIG. 5 is an illustration of an embodiment of a timeout adaptation method.

Referring to FIG. 5, a detailed flow diagram of an embodiment of the handoff adaptation is illustrated. The flow diagram illustrates a method of determining predicted handoff performance in order to effectively adapt the value of handoff timeout. The handoff adaptation uses the past performance of the handoff frequency to compute an adapted value. The time since the pilot was last removed from the Active Set is computed so that the relevance of using the handoff frequency can be evaluated, block 260. Proceeding to process block 262, if the time since the last drop is greater than Tmin, the process continues on to block 264 where the value of T_TDROPs(i) is set equal to the default value T_TDROPmin. If the time since the last drop is less than Tmin, then the process proceeds to block 266 and statistics on the periods of time that the pilot has remained out of the active set are collected. The historical data is used to determine whether the total estimated time that the pilot could be removed from the Active Set is less than the maximum drop timer value, block 268. This determines whether the T_TDROP value can be adapted so that the pilot is not thrashed in and out of the Active Set needlessly. If the pilot is likely to be thrashed, then the process proceeds to block 270 and the value of T_TDROP is incremented. Otherwise the process continues on to block 272, and the value of T_TDROP is decremented. The rate or amount of increment and decrement may be based on adaptive functions, fixed functions, functions that are dependent on the range, as well as other well known functions. The rate or amount of increment and decrement may be transmitted by the network. In one embodiment, the rate or amount of increment and decrement may be computed by scaling a nominal step value by a function of the current set of minimum time periods associated with a set of pilots. In another embodiment, the function for the amount of increment is a scaling by the ratio of the number of handoff timeouts above the nominal timeout to the total handoff timeouts and the function for the amount of decrease is a scaling by the ratio of the number of handoff timeouts below the nominal timeout to the total handoff timeouts.

A hysteresis factor, C_hyst_comp, block 268, may be used to compensate for differences between the add and drop energy thresholds: In one embodiment, the hysteresis factor is larger if the difference between the pilot add and drop thresholds T_ADD and T_DROP respectively is large and vice-versa. In the embodiment shown in FIG. 5, the hysteresis factor is multiplied by the maximum value of the range of the dynamic handoff timeout value and compared to the sum of the time since the last handoff and the current handoff timeout value. If the hysteresis factor term is less than the sum, this indicates that even using the maximum handoff timeout value may be unlikely to result in a pilot being kept during a drop in energy below the T_DROP threshold and, therefore, T_TDROP is decremented according to block 270. If the hysteresis factor term is greater than the sum, this indicates that using a larger handoff timeout value may enable the mobile station to avoid dropping a pilot whose energy temporarily drops below the T_DROP threshold and, therefore, T_TDROP is incremented according to block 272.

Figure 6:
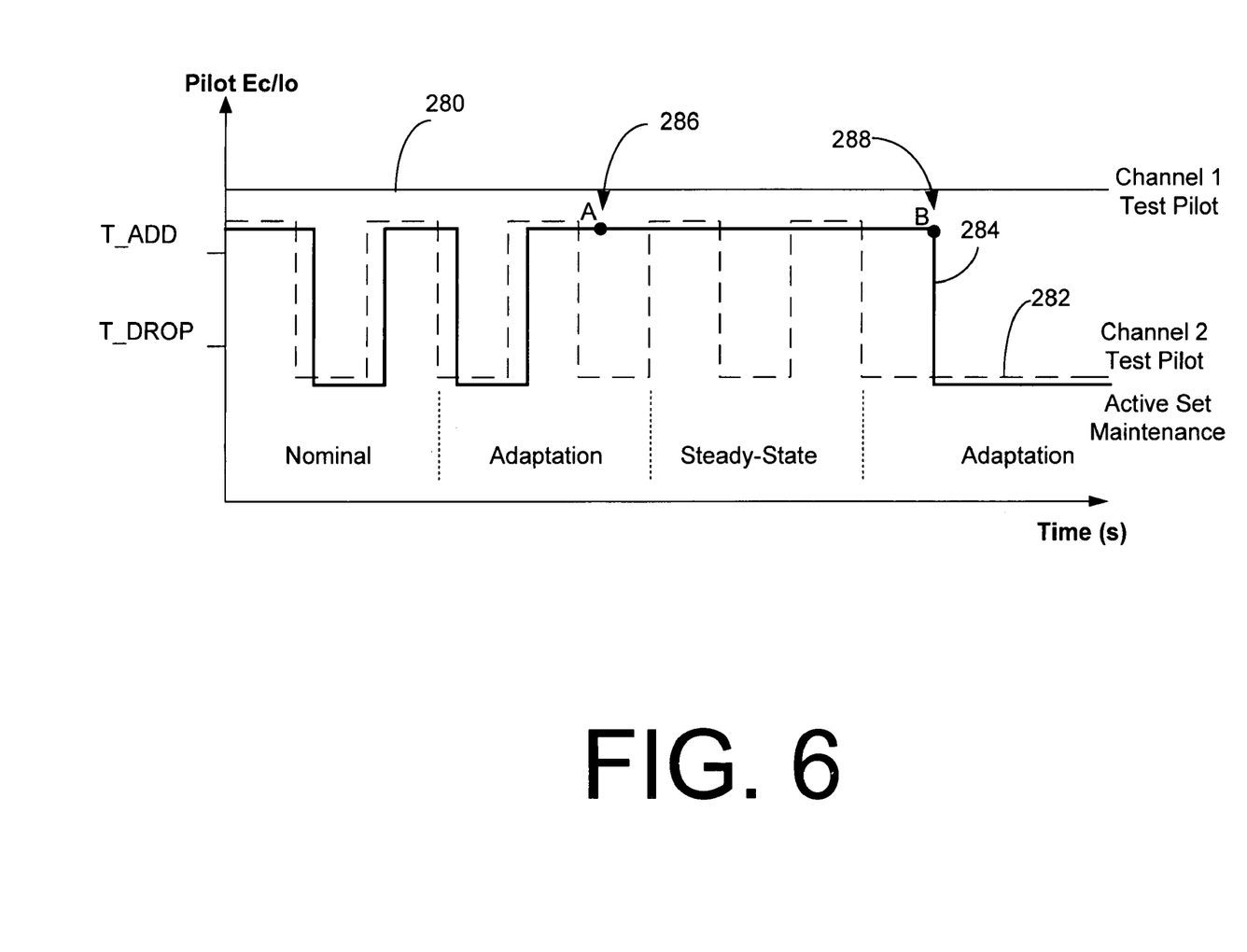
FIG. 6 is an illustration of waveforms depicting the operation of an embodiment of timeout adaptation.

Referring to FIG. 6, waveforms associated with a mobile station 106 dropping and adding a pilot are shown. A first waveform 280 shows a channel 1 test pilot in which the pilot energy-to-interference ratio, Ec/Io, remains greater than the threshold value at which a pilot is moved into the candidate set, T_ADD. A second waveform 282 shows a channel 2 test pilot in which Ec/Io fluctuates from above T_ADD to below T_DROP. An active set maintenance profile 284 shows the channel 2 pilot set maintenance of the mobile station 106 in response to the fluctuations of the channel 2 test pilot. The profile 284, being high or low, signifies that the channel 2 pilot is in or out, respectively, of the active set.

For the initial couple of cycles of the active set waveform, the channel 2 test pilot is added and dropped in conjunction with changes in Ec/Io. Then, at point A 286 of the active set maintenance profile 284, the adaptation of T_TDROP to a larger value, causes the mobile station 106 to retain the channel 2 test pilot in the active set despite Ec/Io of channel 2 being less than T_DROP. The channel 2 test pilot is retained in the active set until at point B 288 the adapted value of T_TDROP is exceeded and the channel 2 test pilot is dropped from the active set.

Figure 11:
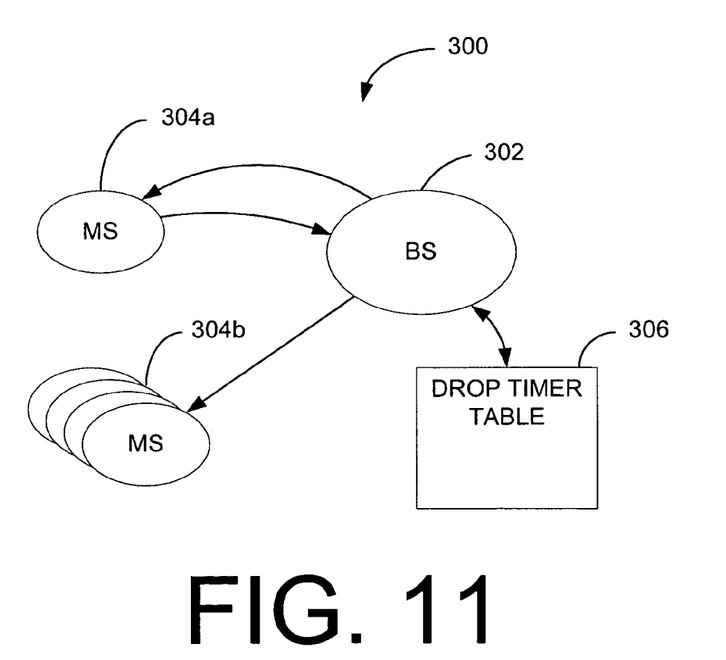
FIG. 11 shows a handoff timing system for use in accordance with the principles of the invention.

FIG. 11 shows a handoff timing system 300 for optimizing the soft handoff mechanism. The handoff timing system 300 includes a base station, BS, 302 in communication with mobile stations, MS, 304a that can adapt the T_TDROP value as well as mobile stations, MS, 304b in the same call category and SHO region, but cannot adapt the T_TDROP value. An adapted T_TDROP value that is sent back to the base station 302 from a mobile station 304a may be used in a feedback mechanism formed by the base station 302 and mobile station 304a to optimize the soft handoff. The adapted T_TDROP value may then be used by the BS 302 to determine revised values for the nominal T_TDROP and its range. The BS 302 then sends the revised values for the nominal T_TDROP and its range to the mobile station 304a and other MS in the same call category and SHO region, if they exist. Thus, a closed loop is formed which eventually optimizes the soft handoff mechanism.

Figure 7:
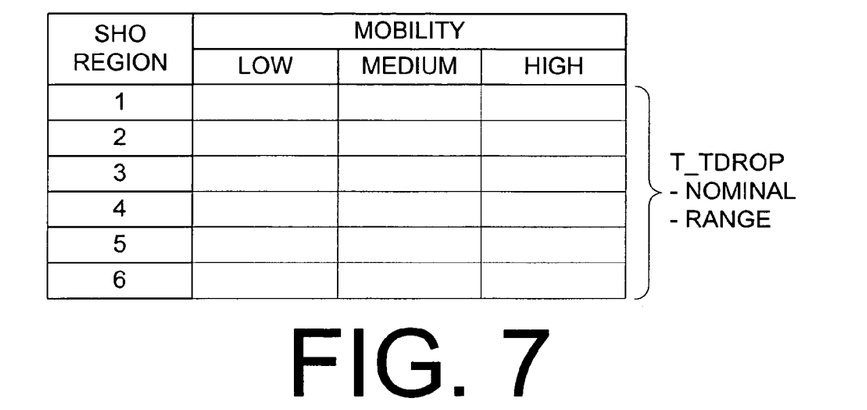
FIG. 7 is an illustration of a look-up-table for use in accordance with the principles of the invention.

A drop timer database may be formed by the base station 302 to store up-to-date values for nominal T_TDROP and range, based on the feedback information from mobile stations such as 304a in each of the soft (softer) handoff regions within the cell site. The drop timer database can be a look-up table 306 that contains the current T_TDROP nominal and range values for an MS performing handoffs in a certain soft handoff region in the cell site. The velocity of the MS can be classified as low, medium or high mobility, and be included as an entry in the look-up-table. An example of the look-up-table is shown in FIG. 7. As the location of the MS can be tracked by the BS through the Global Positioning System (GPS) as well as E-911 location services, velocity of the MS can also be estimated by the BS. For example, if p1, p2 are the position vectors of the MS at time t1 and t2 respectively, the first order approximation of the MS' velocity can be computed as:(p2−p1)/(t2−t1). In case the MS is part of a Telematics application, the velocity of the vehicle can be readily available from the speedometer. A base station can inform a mobile terminal the nominal value and range to be used for T_TDROP, by selecting an entry from the look-up-table, based on the location and velocity of a mobile station (see 630 in FIG. 10). This mechanism avoids the need for a network operator to manually select a static T_TDROP value or even attempt to optimize the network by choosing different T_TDROP value setting occasionally. The adaptation of T_TDROP value at the MS, together with the feedback mechanism enables adapting and correcting the choice of T_TDROP, optimizing the network as a result.

In the event that the mobile station 304a in FIG. 11 does not exist, i.e., none of the mobile stations in the network can adapt the T_TDROP value, the base station BS 302 can then make use of other types of information feedback from the mobile stations to determine the appropriate values for the database entries. For example, receive signal to interference power ratios (C/I) as measured by the mobile stations are indications of the forward link quality and variations. The base station can compute the nominal and range values for T_TDROP in the database, based on some functions that relate T_TDROP to this information feedback from the mobile stations. Other information feedback that can be used similarly include power control commands for the forward link, and pilot strength measurements as reported in the PSMM. In other words, the adaptation of T_TDROP can be performed at the BS.

Figure 10:
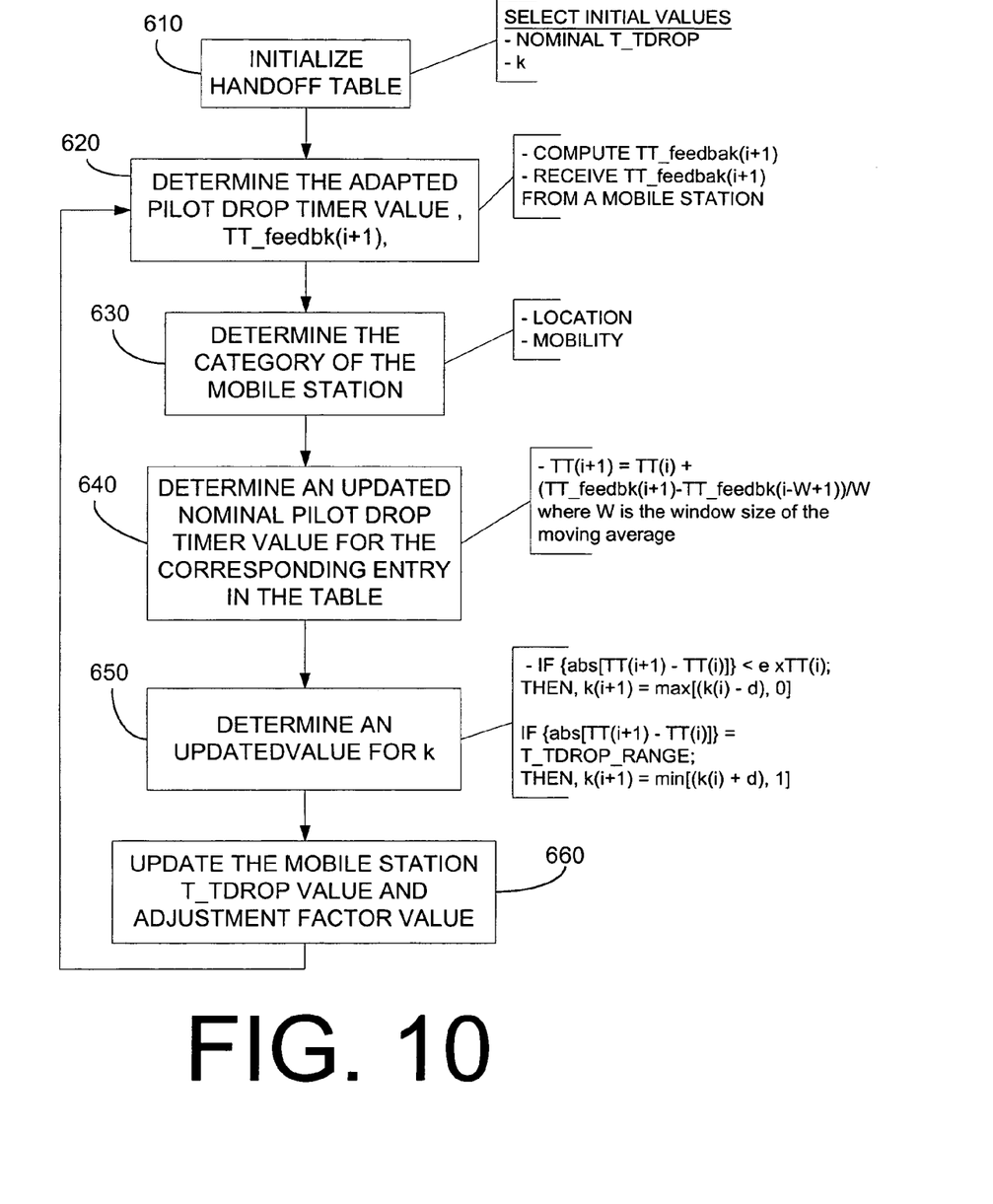
FIG. 10 shows a flow chart for a procedure for use in accordance with the principles of the invention.

FIG. 10 shows a flow chart for a procedure according to one embodiment of the invention. For example, a nominal T_TDROP value of 6 seconds and adjustment factor k=1 can be chosen initially 610. Use of a T_TDROP_RANGE calculation method described later, results in a range of plus or minus 2 seconds from the nominal. This implies that a mobile station can adapt to a T_TDROP value between 4s and 8s. The base station receives T_TDROP feedback values 620 from mobile stations in its cell or sector. The base station then determines the call category of the mobile station corresponding to the feedback value based on, for example, position and velocity 630. If the average T_TDROP value 640 for mobile stations located in a similar part of the cell site and traveling with similar speed is about 4s, the base station can choose 4s to be the new nominal T_TDROP value.

Figure 8:
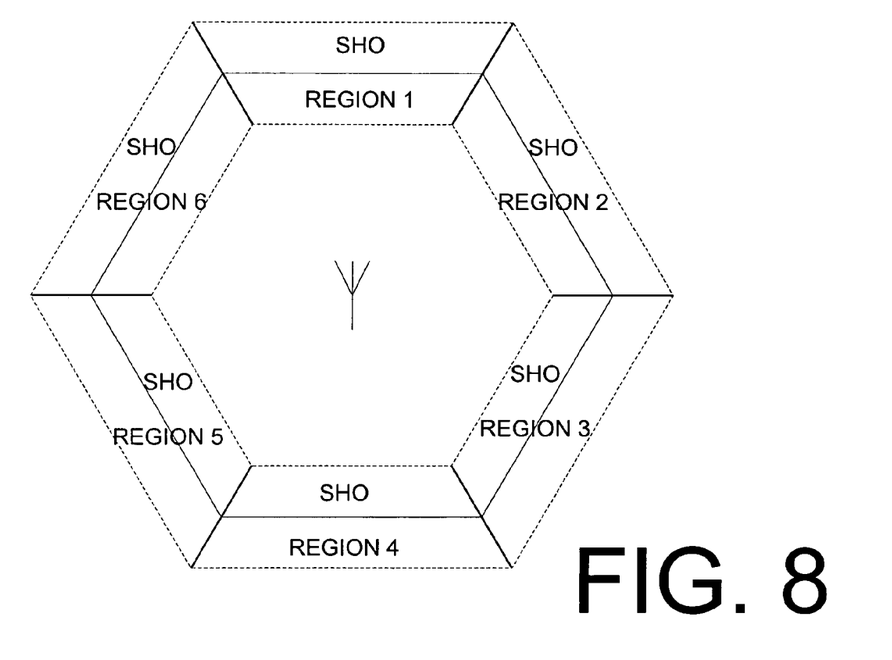
FIG. 8 is an illustration of regions of a cell site of a wireless communications system for use in accordance with the principles of the invention.

FIG. 8 shows an example of a cell site and the handoff regions. Assuming the cell site is approximately hexagonal, there can be six handoff regions (listed as SHO regions 1 through 6 in FIG. 7), each located near to a cell boundary. The look-up table in FIG. 7 can be expanded to include various softer handoff regions within a sectorized cell site.

The drop timer database of the present invention can be used to further enhance the subsequent handoff operations in the cell site in the following ways: 1) For any MS which is located in a certain soft handoff region, the BS can supply more appropriate values for the nominal T_TDROP and its range; thus allowing an MS to adapt more quickly and accurately to the optimal value; 2) an MS that doesn't support dynamic T_TDROP can also gain advantage as the BS can now supply a static T_TDROP value that is closer to the optimal, for a specific SHO region and MS mobility. As a result, the overall performance of the network in soft handoff can be improved.

The database can be updated when a new T_TDROP value is reported by an MS. The T_TDROP value for a certain handoff region and mobility class can be updated by computing the moving average (see 640 in FIG. 10), for example. Other methods can also be used to update the database entries, such as exponential-weighted moving average, simple mean, median, minimum, maximum, mean of minimum and maximum for a certain number of samples, value of the latest feedback sample, some type of filtering on the collection of statistics or functions that can be used to predict a more optimum value for T_TDROP. Another method is to compute the probability distribution (cumulative distribution) of the adapted T_TDROP values feedback by the MS. Then determine the adapted T_TDROP values corresponding to a range which contain x% of samples, e.g. x=90. The lower and upper limits of this range become T_TDROP_MIN and T_TDROP_MAX, which can be related to the nominal T_TDROP and T_TDROP_RANGE as described in a later portion of this specification. These operations can be performed on a collection of all feedback values received from MS in the same category since the last update, or within a certain time window. As shown in 640 in FIG. 10, "W" is the number of samples within the window for computing the moving average.

As discussed above, the method of computing probability distribution of the adapted T_TDROP feedback values is one way of determining both the nominal and range values for T_TDROP in the database. Alternatively, the range of pilot drop timer, T_TDROP_RANGE, can be computed as a function of the nominal T_TDROP value and the available network resources. For example, T_TDROP_RANGE may be proportional to the ratio of the maximum number of users that can be supported by the cell site to the number of currently active users. It may be determined based on the actual network loading of the cell site at that time.

As an example embodiment, T_TDROP_RANGE can be calculated as follows. Let $T_i$ be the nominal value of T_TDROP, and $T_{i-1}$ be a smaller allowable value than $T_i$, as specified in Table 2.6.6.2.3-1 in the TIA/EIA/IS-2000-5 standard and shown in FIG. 9. Let k be an adjustment factor between 0 and 1, which can be set by the network. One of the methods of adjusting k is shown in 650 of FIG. 10, where e is a positive constant value that is typically much less than one, and d is a positive constant value not greater than one, representing the step size of changing k. Thus, $$T\_TDROP\_RANGE = \lfloor (T_i - T_{i-1}) \cdot k \rfloor, \ 0 \leq k \leq 1$$

where $\lfloor x \rfloor$ is the integral part of x.

In case the network specifies the limits for T_TDROP by supplying values of T_TDROP_MAX and T_TDROP_MIN, instead of the nominal and range values for T_TDROP, then the following conversion can be used:

$$T\_TDROP\_MAX = \text{Nominal } T\_TDROP + T\_TDROP\_RANGE$$

$$T\_TDROP\_MIN = \text{Nominal } T\_TDROP - T\_TDROP\_RANGE$$

If the signaling of T_TDROP is implemented through the use of tables similar to the one in FIG. 9 that include standard pilot drop timer values, then table entries that are closest to the computed values of nominal T_TDROP and its range, or T_TDROP_MAX and T_TDROP_MIN may be selected. For example, after determining the revised pilot drop timer value, a standard pilot drop timer value that is closest in value to the revised pilot drop timer value may be selected. An identifier corresponding to the selected standard value may be communicated to the MS, which retrieves a standard pilot drop timer value based upon the identifier.

Alternatively, a different type of signaling may be used to inform the mobile terminal of the pilot drop timer value T_TDROP. The actual nominal and range values of T_TDROP, (or T_TDROP_MAX and T_TDROP_MIN) may be transmitted directly to the mobile terminals.

Another alternative is to communicate to the mobile terminal a modifiable table similar to the standard table shown in FIG. 9. The standard table may include fixed values for entries that conform to CDMA standards. Whereas, the modifiable table may include initial values for the entries that can be updated or revised by the cell site and then communicated to the mobile terminal through some signaling means. In this manner, the entries for the modifiable table may be changed to values that are more suitable for the conditions of the particular cell site.

The network controller can also adjust the value of k in accordance with the network condition and the criteria for network optimization. When the loading of the cell site is relatively low, the T_TDROP_RANGE can be set to a large value by choosing k=1. As there will be relatively fewer feedback of adapted T_TDROP values from the mobile terminals when the cell site is lightly loaded, the nominal values in the T_TDROP data base may be further from the optimal values. Thus a larger range enables the mobile terminal a higher probability in adapting to an optimum value. As observed in the table in FIG. 9, the granularity of the nominal T_TDROP is lowered as the latter increases. Thus, a larger range can be set for higher nominal values to improve the granularity in the adaptation to optimal values. The values in the database may become stabilized in some circumstances. In that case, the base station can decide that the T_TDROP settings in the look-up-table can achieve sufficient optimality. It may then set the range to zero by choosing k=0. With the feedback mechanism as described here, it is expected that the nominal value would be updated periodically depending on the dynamics in the cell site as reported by the various MS. As a result, the above example represents a sufficient range.

The BS can inform MS in the various handoff regions up-to-date values for the T_TDROP nominal and range periodically, for example, in the general handoff direction message as in TIA/EIA/IS-2000.

MS in the soft handoff regions can send their values of the dynamic T_TDROP timer to the BS through Layer 3 messaging, such as the Handoff completion messages in TIA/EIA/IS-2000-5.

A number of embodiments of the invention have been described. Nevertheless, it will be understood that various modifications may be made without departing from the spirit and scope of the invention such as executing all or portions of the adaptation method in a base station. Accordingly, other embodiments are within the scope of the following claims.

What is claimed is:

1. A method of generating handoff timing parameters, comprising:
   initializing a drop timer database including current pilot drop timer values being a function of a database call category;
   receiving an adapted pilot drop timer value from a wireless device;
   determining a call category of the wireless device;
   determining a revised pilot drop timer value corresponding to the wireless device call category; and
   updating the drop timer database to reflect the revised pilot drop timer value; wherein
   determining a revised pilot drop timer value includes computing a probability distribution of at least two pilot drop timer values generated by the wireless device during a predetermined time period and corresponding to the wireless device call category.

2. The method of claim 1 wherein determining a call category includes:
   determining at least one call characteristic; and
   querying the drop timer database to determine the call category corresponding to the call characteristic.

3. The method of claim 1 further comprising updating the mobile wireless device pilot drop timer value based on the current pilot drop timer value in the drop timer database corresponding to the call category of the mobile wireless device.

4. The method of claim 1 wherein the drop timer database further includes current adjustment factors corresponding to the current pilot drop timer values.

5. The method of claim 4 further comprising:
   determining a revised adjustment factor corresponding to the wireless device call category; and
   updating the drop timer database to reflect the revised adjustment factor.

6. The method of claim 1 wherein the adapted pilot drop timer value is selected from the group consisting of a nominal value and a range value, and a maximum value and a minimum value.

7. The method of claim 6 updating the mobile wireless device adjustment factor based on the current adjustment factor in the drop timer database corresponding to the call category of the mobile wireless device.

8. The method of claim 1 further comprising sending the revised pilot drop timer value to the wireless device.

9. The method of claim 8 wherein sending includes sending the revised pilot drop timer value to other wireless devices in the wireless device call category.

10. The method of claim 8 wherein the revised pilot drop timer value includes a nominal value and a range value.

11. The method of claim 8 wherein the revised pilot drop timer value includes a maximum value and a minimum value.

12. A method of generating handoff timing parameters, comprising:
    initializing a drop timer database including current pilot drop timer values being a function of a database call category;
    receiving an adapted pilot drop timer value from a wireless device;
    determining a call category of the wireless device;
    determining a revised pilot drop timer value corresponding to the wireless device call category;
    updating the drop timer database to reflect the revised pilot drop timer value;
    determining an identifier corresponding to the revised pilot drop timer value; and
    communicating the identifier to the wireless device;
    wherein determining the identifier includes;
    querying a standard table to determine a standard pilot drop timer value being closest in value to the revised pilot drop timer value; and
    selecting the identifier corresponding to the standard pilot drop timer value; and
    wherein determining a revised pilot drop timer value includes computing a probability distribution of at least two pilot drop timer values generated by the wireless device during a predetermined time period and corresponding to the wireless device call category.

13. A method of generating handoff timing parameters, comprising:
    initializing a drop timer database including current pilot drop timer values being a function of a database call category;
    receiving an adapted pilot drop timer value from a wireless device;
    determining a call category of the wireless device;
    determining a revised pilot drop timer value corresponding to the wireless device call category;
    updating the drop timer database to reflect the revised pilot drop timer value;
    determining an identifier corresponding to the revised pilot drop timer value; and communicating the identifier to the wireless device;
wherein determining the identifier includes;
querying a modifiable table to determine a modified pilot drop timer value being closest in value to the revised pilot drop timer value; and
selecting the identifier corresponding to the modified pilot drop timer value; and
wherein determining a revised pilot drop timer value includes computing a probability distribution of at least two pilot drop timer values generated by the wireless device during a predetermined time period and corresponding to the wireless device call category.

* * * * *